(12) United States Patent  
Schaffner

(10) Patent No.: US 9,088,349 B2
(45) Date of Patent: Jul. 21, 2015

(54) SYSTEM AND METHOD FOR TRANSMITTING AND DETECTING SPREAD SPECTRUM SIGNALS

(75) Inventor: Terry M. Schaffner, Warrenville, IL (US)

(73) Assignee: Digi International Inc., Minnetonka, MN (US)

( * ) Notice: Subject to any disclaimer, the term of this patent is extended or adjusted under 35 U.S.C. 154(b) by 1147 days.

(21) Appl. No.: 11/764,597

(22) Filed: Jun. 18, 2007

(65) Prior Publication Data

US 2008/0310481 A1    Dec. 18, 2008

(51) Int. Cl.
*H04B 1/00* (2006.01)
*H04B 1/7183* (2011.01)
*H04B 1/69* (2011.01)

(52) U.S. Cl.
CPC ...... *H04B 1/7183* (2013.01); *H04B 2001/6912* (2013.01)

(58) Field of Classification Search
CPC ............... H04B 1/7183; H04B 2001/6912
USPC .............. 375/354, 355, 139, 295, 316, 324
See application file for complete search history.

(56) References Cited

U.S. PATENT DOCUMENTS

| | | | |
|---|---|---|---|
| 4,532,603 A * | 7/1985 | Gerard | 708/813 |
| 6,396,866 B1 * | 5/2002 | Upton et al. | 375/139 |
| 6,493,405 B1 | 12/2002 | Olaker et al. | |
| 6,943,405 B2 | 9/2005 | Bryant et al. | |
| 7,068,704 B1 * | 6/2006 | Orr | 375/139 |
| 7,177,343 B1 * | 2/2007 | Citta et al. | 375/139 |
| 7,245,930 B1 | 7/2007 | Vishwanath et al. | |
| 2003/0022651 A1 | 1/2003 | Bannasch et al. | |
| 2005/0163201 A1 * | 7/2005 | Krasner | 375/150 |
| 2006/0114747 A1 * | 6/2006 | Hentati et al. | 367/83 |
| 2008/0165833 A1 * | 7/2008 | Lee | 375/139 |
| 2008/0309543 A1 | 12/2008 | Schaffner | |

FOREIGN PATENT DOCUMENTS

EP        1599001 A1    11/2005
WO    WO-03092183 A2     6/2003

OTHER PUBLICATIONS

"European Application Serial No. 08252093.3, filed on Jun. 18, 2008, European Search Report mailed Oct. 10, 2008", 7 pgs.
"European Application Serial No. 08252093.3, Office Action Mailed Jun. 15, 2009", 1 pg.
"European Application Serial No. 08252099.0, Search Report mailed Jun. 15, 2009", 1 pg.

(Continued)

*Primary Examiner* — Freshteh N Aghdam
(74) *Attorney, Agent, or Firm* — Fogg & Powers LLC

(57) ABSTRACT

This document discusses, among other things, a system and method of detecting wideband signals of bandwidth X within a communications system having a coherency time constant of T. A synchronization signal is generated as a function of a chirp signal that sweeps a portion of bandwidth X. The synchronization signal is transmitted and received as a wideband signal at a receiver. The receiver detects the synchronization signal within the wideband signal received at the receiver by generating a detection signal, correlating the received wideband signal with the detection signal and indicating when the synchronization signal is detected within the wideband signal. The detection signal is a complex conjugate of the synchronization signal.

35 Claims, 4 Drawing Sheets

(56) References Cited

OTHER PUBLICATIONS

"European Application Serial No. 08252099.0, Search Report mailed Oct. 6. 2008", 7 pages.

Hengstler, S., et al., "A novel chirp modulation spread spectrum technique for multiple access", *2002 IEEE Seventh International Symposium on Spread Spectrum Techniques and Applications*, (2002), 73-77.

Kowatsch, M., et al., "A Spread-Spectrum Concept Combining Chirp Modulation and Pseudonoise Coding", *IEEE Transactions on Communications*, 31(10), (Oct. 1983), 1133-1142.

Springer, A., et al., "Spread Spectrum Communications Using Chirp Signals", *IEEE/AFCEA EUROCOMM 2000. Information Systems for Enhanced Public Safety and Security.*, (2000), 166-170.

"U.S. Appl. No. 11/764,579 Non-Final Office Action mailed Feb. 3, 2010", 11 pgs.

"U.S. Appl. No. 11/764,579, Response filed May 13, 2010 to Non Final Office Action mailed Feb. 3, 2010", 16 pgs.

U.S. Patent and Trademark Office, "Office Action", "from U.S. Appl. No. 11/764,579", Dec. 4, 2014, pp. 1-19, Published in: US.

U.S. Patent and Trademark Office, "Decision on Appeal", "from U.S. Appl. No. 11/764,579", Sep. 26, 2014, pp. 1-7, Published in: US.

U.S. Patent and Trademark Office, "Examiner's Answer to Appeal Brief", "from U.S. Appl. No. 11/764,579", Feb. 17, 2012, pp. 1-17, Published in: US.

U.S. Patent and Trademark Office, "Final Office Action", "from U.S. Appl. No. 11/764,579", Aug. 6, 2010, pp. 1-12, Published in: US.

U.S. Patent and Trademark Office, "Final Office Action", "from U.S. Appl. No. 11/764,579", May 10, 2011, pp. 1-15, Published in: US.

U.S. Patent and Trademark Office, "Office Action", "from U.S. Appl. No. 11/764,579", Dec. 27, 2010, pp. 1-13, Published in: US.

U.S. Patent and Trademark Office, "Pre-Appeal Brief Conference Decision", "from U.S. Appl. No. 11/764,579", Oct. 19, 2010, pp. 1-2, Published in: US.

U.S. Patent and Trademark Office, "Pre-Appeal Brief Conference Decision", "from U.S. Appl. No. 11/764,579", Sep. 22, 2011, pp. 1-2, Published in: US.

U.S. Patent and Trademark Office, "Notice of Allowance", "From U.S. Appl. No. 11/764,579", Mar. 13, 2015, pp. 1-12, Published in: US.

* cited by examiner

SYSTEM AND METHOD FOR TRANSMITTING AND DETECTING SPREAD SPECTRUM SIGNALS

TECHNICAL FIELD

This patent document pertains generally to data communications, and more particularly, but not by way of limitation, to a system and method for transmitting and detecting wideband signals in the presence of noise.

BACKGROUND

Coherent detection is better than noncoherent detection for detecting extremely weak spread spectrum signals. That is especially so as signal to noise ratios fall below unity (0 dB). For communication systems employing high spreading factors, the coherency bandwidth of the system may, however, be too low to coherently detect the spread spectrum signal over the symbol period duration. The receiver must therefore employ noncoherent (i.e., energy accumulation) detection after the coherency bandwidth is reached and exceeded.

What is needed is a system and method for coherently detecting extremely weak wideband or spread spectrum signals.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, coherent detection is better than noncoherent detection for detecting extremely weak spread spectrum signals. That is especially so as signal to noise ratios fall below unity (0 dB). For communication systems employing high spreading factors, the coherency bandwidth of the system may, however, be too low to coherently detect the spread spectrum signal over the symbol period duration. The receiver must therefore employ noncoherent (i.e., energy accumulation) detection after the coherency bandwidth is reached and exceeded.

Figure 1:
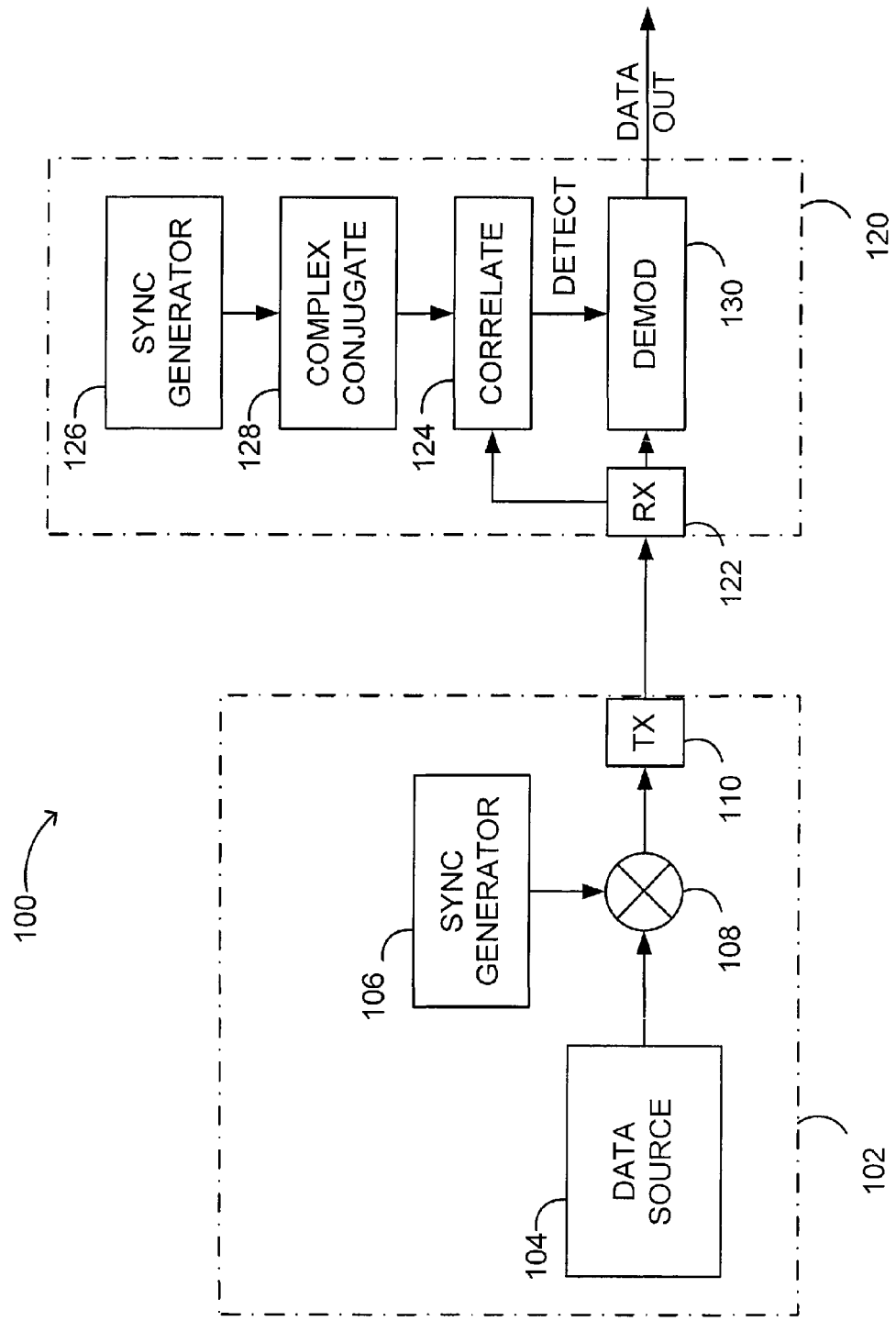
FIG. 1 illustrates a communication system according to the present invention.

A system and method for coherently detecting extremely weak spread spectrum and other wideband signals is shown in FIG. 1. In FIG. 1, system 100 includes a transmitter 102 and a receiver 120. Transmitter 102 includes a data source 104, a synchronization signal generator 106, a combiner 108 and a transmit circuit 110. Data source 104 generates a stream of data. In one embodiment, synchronization signal generator 106 generates a chirp signal that is combined with the stream of data using combiner 108 in a manner known in the art A frequency domain representation of a chirp signal transmitted by transmitter 102 is shown as transmit signal 140 in FIG. 2. In one embodiment, the chirp signal used in transmitter 102 is a complex sinusoid that rapidly sweeps across the frequency bandwidth of the signal. In one such embodiment, each frequency is occupied for only a single chirp sample.

Figure 2:
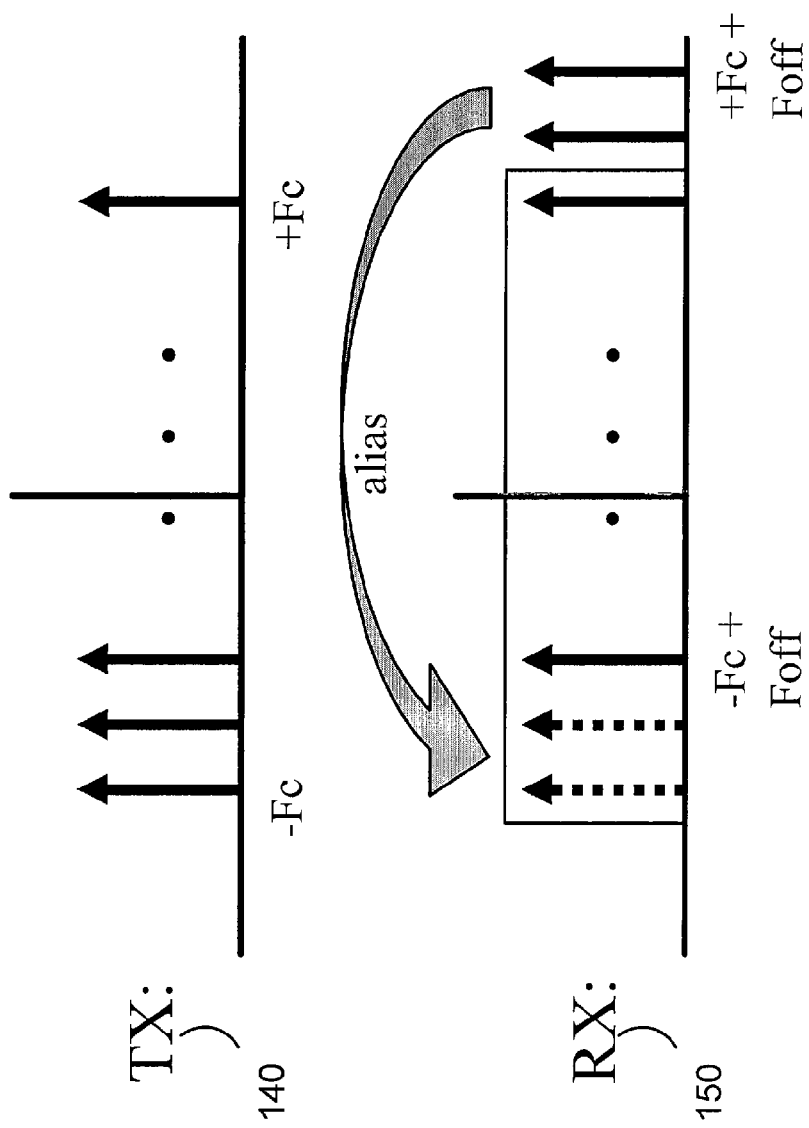
FIG. 2 is a frequency domain representation of the transmitted and received synchronization signals.

At receiver 120, the received signal 150 may be shifted in frequency due to the offset between the transmitter 102's local oscillator and the local oscillator in receiver 120, as well as any Doppler effects. The correlation of received signal 150 with the transmitted chirp is illustrated in FIG. 2. Despite the presence of a large frequency offset, the received signal is perfectly correlated to the transmitted signal. Note that the received signal's higher frequency components will alias and correlate with the transmitted signal.

System 100 exploits this property of frequency offset tolerance in order to detect extremely weak signals at significant frequency offsets with respect to the receiver. This is accomplished at the transmitter by simply repeating the chirp sequence a number of times to construct a data un-modulated synchronization sequence.

Returning to FIG. 1, receiver 120 includes a receiver circuit 122, a digital correlator 124, a synchronization signal generator 126, a complex conjugate calculator 128 and a demodulator 130. Complex conjugate calculator 128 calculates the complex conjugate of a synchronization signal generated by synchronization signal generator 126. Digital correlator 124 takes the complex conjugate of the synchronization signal generated by synchronization signal generator 126 and uses it to detect the transmitted synchronization signal. This transmission can be initial signaling for packet-based data transmissions or for access channels. In one embodiment, synchronization signal generator 126 generates a chirp signal similar to one generated by synchronization signal generator 106.

System 100 therefore achieves coherent detection of a signal beyond the system's coherency bandwidth through the use of chirp modulation for a data-unmodulated sync or preamble.

Figure 3:
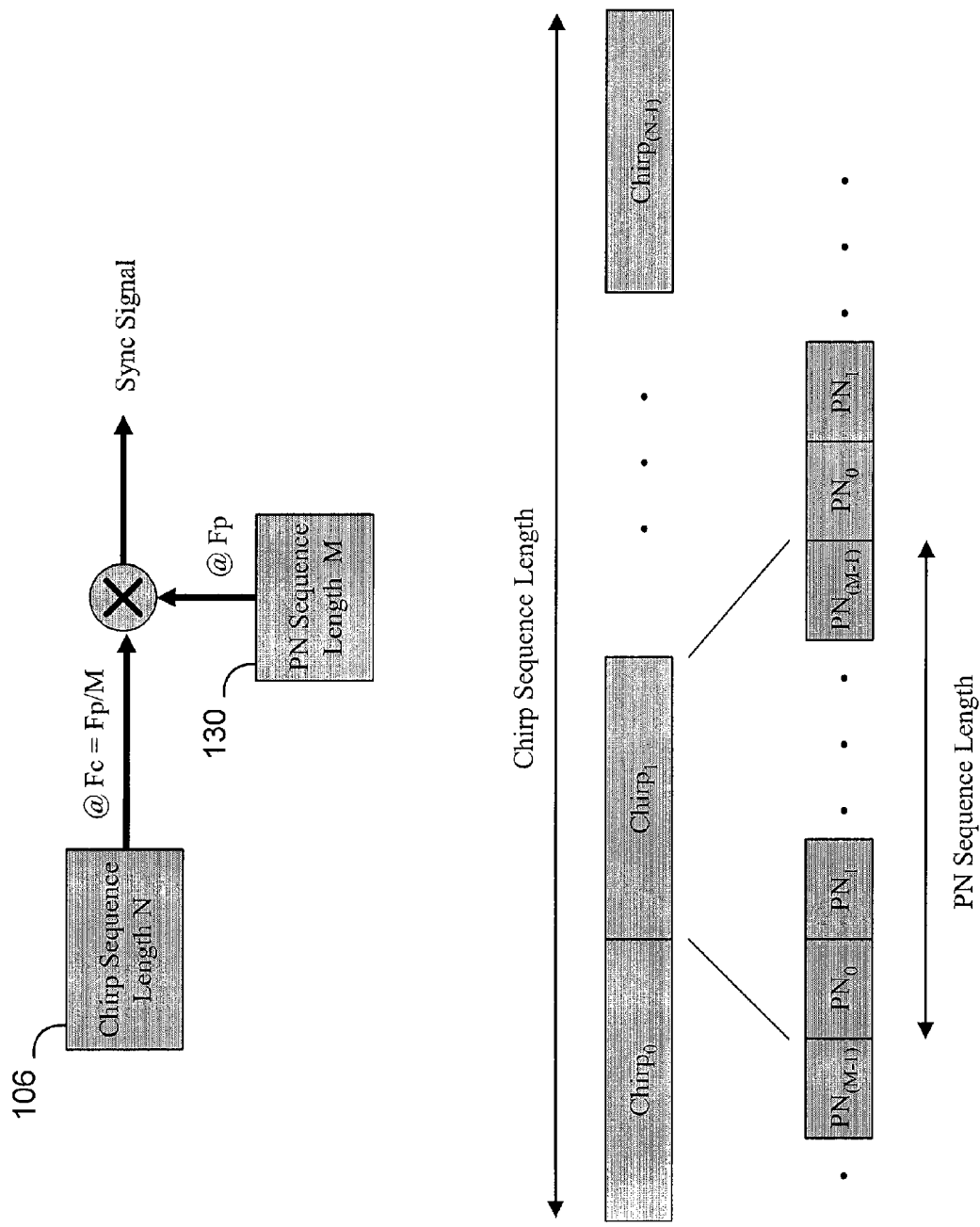
FIG. 3 illustrates a synchronization signal formed by modulating a PN sequence with a chirp sequence.

In one embodiment, such as is shown in FIG. 3, the sync or preamble is formed by modulating a PN sequence (generated by PN sequence generator 130) with a linear frequency chirp sequence. As shown in FIG. 3, a length M PN sequence is multiplied by a length N chirp sequence to produce a length M*N concatenated code. This code can be used as a preamble for initial acquisition.

An embodiment such as is shown in FIG. 3 reduces processing complexity but at the expense of diminished autocorrelation properties. In one such embodiment, the PN sequence length is chosen to be shorter than the coherency time constant for the system. In addition, multiple chirp sequences may be concatenated to further reduce the processing complexity. Due to the greatly reduced processing complexity, the receiver can be implemented in off-the-shelf FPGAs or ASICs.

Figure 4:
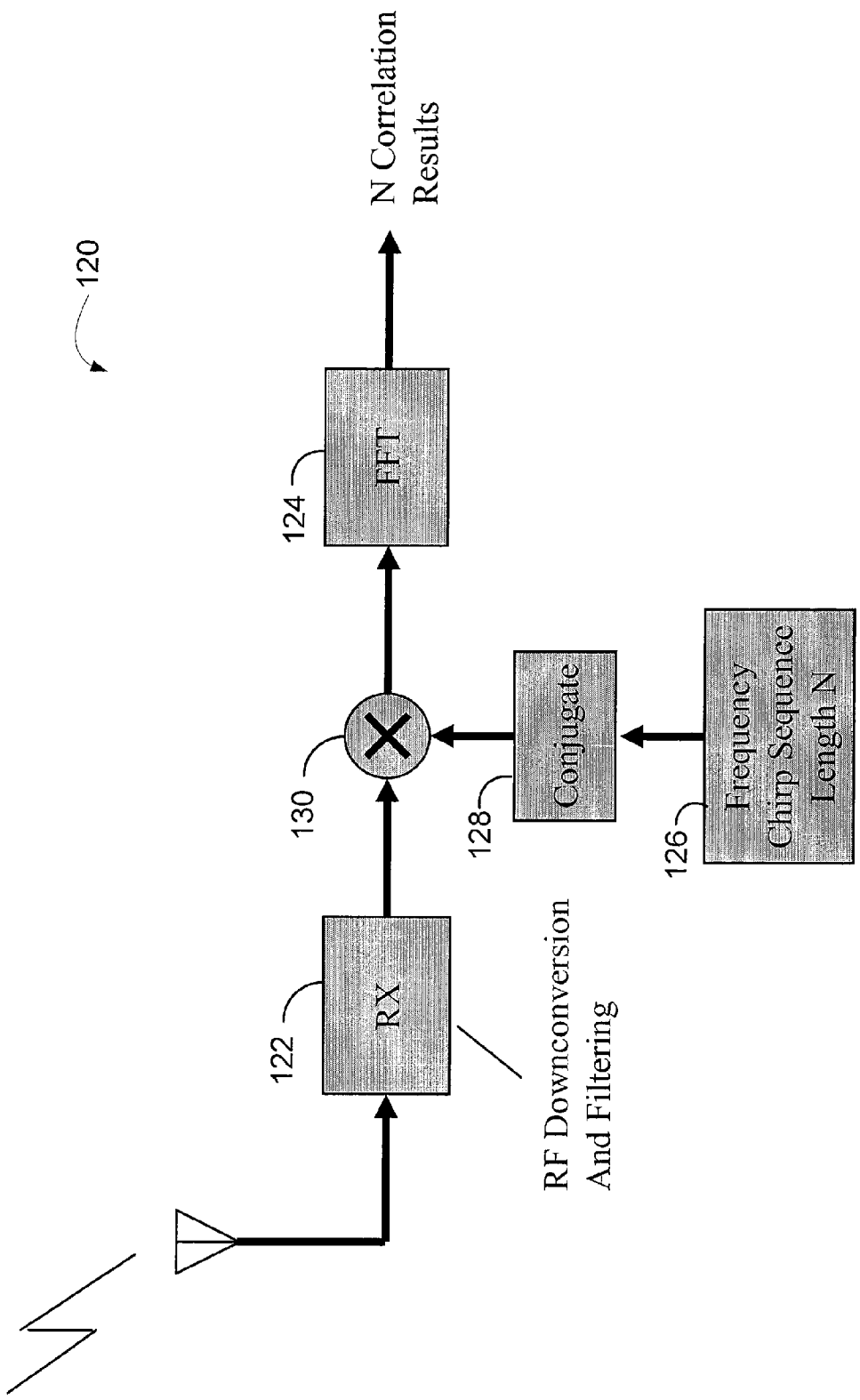
FIG. 4 illustrates one example approach to performing chirp correlation.

In one embodiment, as illustrated in FIG. 4, receiver circuit 122 performs RF down-conversion and filtering while digital correlator 124 is implemented using a Fast Fourier Transform (FFT). The difference in the implementation shown in FIG. 4 is that instead of directly correlating with the detection signal, the N received samples are multiplied one-for-one with the detection signal and fed into an N-point FFT. This is functionally equivalent to performing N correlations with the detection signal.

In summary, system 100 solves the problem of detecting a signal with an extremely low signal to noise ratio. It relaxes the coherency bandwidth requirements for a communication system, allowing low cost, lower stability oscillators to be used.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

What is claimed is:

1. A method of detecting wideband signals of bandwidth X within a communications system having a coherency time constant of T, comprising:
   generating a synchronization signal, wherein generating a synchronization signal includes:
      generating a chirp sequence that sweeps a portion of bandwidth X;
      repeating the chirp sequence a plurality of times, wherein each repeated chirp sequence is within a same portion of bandwidth X, wherein each repeated chirp sequence is a wideband chirp sequence; and
      concatenating the plurality of chirp sequences such that the plurality of chirp sequences are received at a receiver in the same symbol period;
   transmitting the synchronization signal;
   receiving a wideband signal at the receiver; and
   detecting the synchronization signal within the wideband signal received at the receiver, wherein detecting includes:
      generating a detection signal, wherein the detection signal is a complex conjugate of a receiver synchronization signal generated in the receiver;
      correlating the received wideband signal with the detection signal to obtain one or more correlation results; and
      indicating when the synchronization signal is detected within the wideband signal.

2. The method of claim 1, wherein the chirp sequence sweeps linearly across the portion of bandwidth X such that each frequency is occupied for only a single chirp sample during each sweep.

3. The method of claim 1, wherein generating a synchronization signal further includes modulating a pseudo-noise (PN) sequence with the chirp sequence.

4. The method of claim 3, wherein the PN sequence has a length M, wherein M is less than T.

5. The method of claim 3, wherein the chirp sequence sweeps linearly across the portion of bandwidth X such that each frequency is occupied for only a single chirp sample during each sweep.

6. The method of claim 1, wherein the detection signal is of length N and wherein correlating the received wideband signal with the detection signal comprises:
   multiplying the receive samples with the detection signal to create N product samples; and
   performing a transform on the N product samples to obtain a set of correlation results.

7. The method of claim 6, wherein the transform is a Fast Fourier Transform.

8. The method of claim 1, wherein the synchronization signal is detected when the correlation results have a magnitude above a predetermined threshold.

9. A transmitter, comprising:
   a synchronization signal generator, wherein the synchronization signal generator generates a synchronization signal, wherein the synchronization signal includes a chirp signal repeated a plurality of times, wherein each repeated chirp signal is within a same portion of bandwidth X, wherein each repeated chirp signal is a wideband chirp signal, wherein the plurality of chirp signals concatenated together such that the plurality of chirp signals are received at a receiver in the same symbol period;
   a data source;
   one or more modulators, wherein the modulators modulate data from the data source to form a data-modulated wideband signal of bandwidth X and wherein the modulators modulate the synchronization signal to form a modulated synchronization signal that sweeps a portion of bandwidth X; and
   a transmitter circuit connected to the one or more modulators, wherein the transmitter circuit transmits the modulated synchronization signal and the data-modulated wideband signal at different times.

10. The transmitter of claim 9, wherein the chirp signal is a linear frequency chirp signal.

11. The transmitter of claim 9, wherein the chirp signal sweeps linearly across the portion of bandwidth X such that each frequency is occupied for only a single chirp sample during each sweep.

12. The transmitter of claim 9, wherein the transmitter transmits the modulated synchronization signal as a preamble to the data-modulated wideband signal.

13. The transmitter of claim 9, wherein the synchronization signal generator further includes a pseudo-noise generator, wherein the pseudo-noise generator generates a PN sequence of length M, wherein the PN sequence is modulated by the chirp signal to form the synchronization signal.

14. The transmitter of claim 13, wherein the transmitter is designed to operate in a system having a coherency time constant of T and wherein M is chosen to be less than T.

15. The transmitter of claim 13, wherein the chirp signal is a linear frequency chirp signal.

16. The transmitter of claim 13, wherein the chirp signal sweeps linearly across the portion of bandwidth X such that each frequency is occupied for only a single chirp sample during each sweep.

17. A receiver for use in a communications system having a coherency time constant of T and a transmitter that transmits wideband signal including a synchronization signal, the receiver comprising:
- a receiver circuit for receiving a wideband signal of bandwidth X;
- a synchronization signal detector, connected to the receiver circuit, wherein the synchronization signal detector detects the synchronization signal within the wideband signal, wherein the synchronization signal detector includes:
  - a detection signal generator, wherein the detection signal generator generates a detection signal, wherein the detection signal is a complex conjugate of a receiver synchronization signal generated in the receiver, wherein the detection signal is of length N; and
  - a correlator, wherein the correlator correlates the received wideband signal with the detection signal to obtain one or more correlation results and wherein the correlator indicates when the synchronization signal is detected as a function of the correlation results, wherein the correlator includes:
    - a multiplication circuit, wherein the multiplication circuit multiplies the receive samples with the detection signal to create N product samples; and
    - means for performing a transform on the N product samples to obtain a set of correlation results; and
- a demodulator connected to the synchronization signal detector, wherein the demodulator recovers data from the wideband signal after the synchronization signal is detected;
- wherein the synchronization signal includes a chirp signal repeated a plurality of times, wherein each repeated chirp signal is within a same portion of bandwidth X, wherein each repeated chirp signal is a wideband chirp signal, the plurality of chirp signals concatenated together such that the plurality of chirp signals are received at the receiver circuit in the same symbol period.

18. The receiver of claim 17, wherein the chirp signal is a linear frequency chirp signal.

19. The receiver of claim 17, wherein the chirp signal sweeps linearly across the portion of bandwidth X such that each frequency is occupied for only a single chirp sample during each sweep.

20. The receiver of claim 17, wherein the synchronization signal is transmitted as a preamble.

21. The receiver of claim 17, wherein the synchronization signal includes a pseudo-noise (PN) sequence modulated by the chirp signal, wherein the PN sequence is of length M, wherein M is less than a coherency time constant.

22. The receiver of claim 21, wherein the chirp signal is a linear frequency chirp signal.

23. The receiver of claim 21, wherein the chirp signal sweeps linearly across the portion of bandwidth X such that each frequency is occupied for only a single chirp sample during each sweep.

24. The receiver of claim 17, wherein the transform is a Fast Fourier Transform.

25. The receiver of claim 17, wherein the synchronization signal is detected when the correlation results have a magnitude above a predetermined threshold.

26. A communication system having a coherency time constant T, comprising:
- one or more transmitters, wherein each transmitter includes:
  - a synchronization signal generator, wherein synchronization signal generator generates a synchronization signal, wherein the synchronization signal includes a chirp signal repeated a plurality of times, wherein each repeated chirp signal is within a same portion of bandwidth X, wherein each repeated chirp signal is a wideband chirp signal, the plurality of chirp signals concatenated together such that the plurality of chirp signals are received in the same symbol period;
  - a data source;
  - one or more modulators, wherein the modulators modulate data from the data source to form a data-modulated wideband signal of bandwidth X and wherein the modulators modulate the synchronization signal to form a modulated synchronization signal that sweeps a portion of bandwidth X; and
  - a transmitter circuit connected to the one or more modulators, wherein the transmitter circuit transmits the modulated synchronization signal and the data-modulated wideband signal at different times; and
- one or more receivers, wherein the receivers include:
  - a receiver circuit for receiving a wideband signal of bandwidth X;
  - a synchronization signal detector, connected to the receiver circuit, wherein the synchronization signal detector detects the synchronization signal within the wideband signal, wherein the synchronization signal detector includes:
    - a detection signal generator, wherein the detection signal generator generates a detection, wherein the detection signal is a complex conjugate of a receiver synchronization signal generated in the receiver; and
    - a correlator, wherein the correlator correlates the received wideband signal with the detection signal to obtain one or more correlation results and wherein the correlator indicates when the synchronization signal is detected as a function of the correlation results; and
  - a demodulator connected to the synchronization signal detector, wherein the demodulator recovers data from the wideband signal after the synchronization signal is detected.

27. The system of claim 26, wherein the chirp signal is a linear frequency chirp signal.

28. The system of claim 26, wherein the chirp signal sweeps linearly across the portion of bandwidth X such that each frequency is occupied for only a single chirp sample during each sweep.

29. The system of claim 26, wherein the modulated synchronization signal is transmitted as a preamble.

30. The system of claim 26, wherein the synchronization signal includes a pseudo-noise (PN) sequence modulated by the chirp signal, wherein the PN sequence is of length M, wherein M is less T.

31. The system of claim 30, wherein the chirp signal is a linear frequency chirp signal.

32. The system of claim 30, wherein the chirp signal sweeps linearly across the portion of bandwidth X such that each frequency is occupied for only a single chirp sample during each sweep.

33. The system of claim 26, wherein the detection signal is of length N and wherein the correlator includes:

a multiplication circuit, wherein the multiplication circuit multiplies the receive samples with the detection signal to create N product samples; and means for performing a transform on the N product samples to obtain a set of correlation results.

34. The system of claim 33, wherein the transform is a Fast Fourier Transform.

35. The system of claim 26, wherein the synchronization signal is detected when the correlation results have a magnitude above a predetermined threshold.

* * * * *